(12) United States Patent
Tanaka et al.

(10) Patent No.: US 12,126,386 B2
(45) Date of Patent: Oct. 22, 2024

(54) OPTICAL TRANSMITTER THAT TRANSMITS MULTI-LEVEL OPTICAL SIGNAL

(71) Applicant: Fujitsu Limited, Kawasaki (JP)

(72) Inventors: Shinsuke Tanaka, Hiratsuka (JP); Tomoyuki Akiyama, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 80 days.

(21) Appl. No.: 17/953,375

(22) Filed: Sep. 27, 2022

(65) Prior Publication Data
US 2023/0188219 A1 Jun. 15, 2023

(30) Foreign Application Priority Data
Dec. 15, 2021 (JP) .................. 2021-203720

(51) Int. Cl.
*H04B 10/50* (2013.01)
*H04B 10/548* (2013.01)

(52) U.S. Cl.
CPC ......... *H04B 10/548* (2013.01); *H04B 10/501* (2013.01)

(58) Field of Classification Search
CPC ............................. H04B 10/548; H04B 10/501
USPC ........................................................... 398/187
See application file for complete search history.

(56) References Cited

U.S. PATENT DOCUMENTS

| 7,787,713 | B2 | 8/2010 | Roberts et al. |
| 8,238,757 | B2* | 8/2012 | Bai ............... H04B 10/5167 398/186 |
| 9,366,937 | B2* | 6/2016 | Sudo ............... H04B 10/508 |
| 2003/0184838 | A1 | 10/2003 | Akiyama et al. |
| 2010/0014862 | A1* | 1/2010 | Suzuki ............... H04Q 3/00 398/79 |
| 2010/0254715 | A1 | 10/2010 | Yamashita et al. |
| 2021/0135761 | A1 | 5/2021 | Tanaka et al. |

FOREIGN PATENT DOCUMENTS

| JP | 2003-279912 A | 10/2003 |
| JP | 2010-243767 A | 10/2010 |
| JP | 2021-071616 A | 5/2021 |

* cited by examiner

*Primary Examiner* — Mohammad R Sedighian
(74) *Attorney, Agent, or Firm* — Fujitsu Intellectual Property Center

(57) ABSTRACT

Optical transmitter includes: signal processing circuit, optical modulator, optical filter, and delay circuit. The signal processing circuit generates N drive signals for generating a modulated optical signal. Symbol rate of the modulated optical signal is fs and each symbol of the modulated optical signal transmits N bits. The optical modulator includes Mach-Zehnder interferometer and N phase-shift segments each of which shifts a phase of light propagating through an optical path of the Mach-Zehnder interferometer according to the N drive signals. The optical filter removes, from output light of the optical modulator, a frequency component in a range of ±fs/2 with respect to a center frequency of the modulated optical signal, and extracts at least a part of other frequency components. The delay circuit controls timings of the N drive signals so as to reduce optical power of the frequency component extracted by the optical filter.

6 Claims, 17 Drawing Sheets

RELATED ART

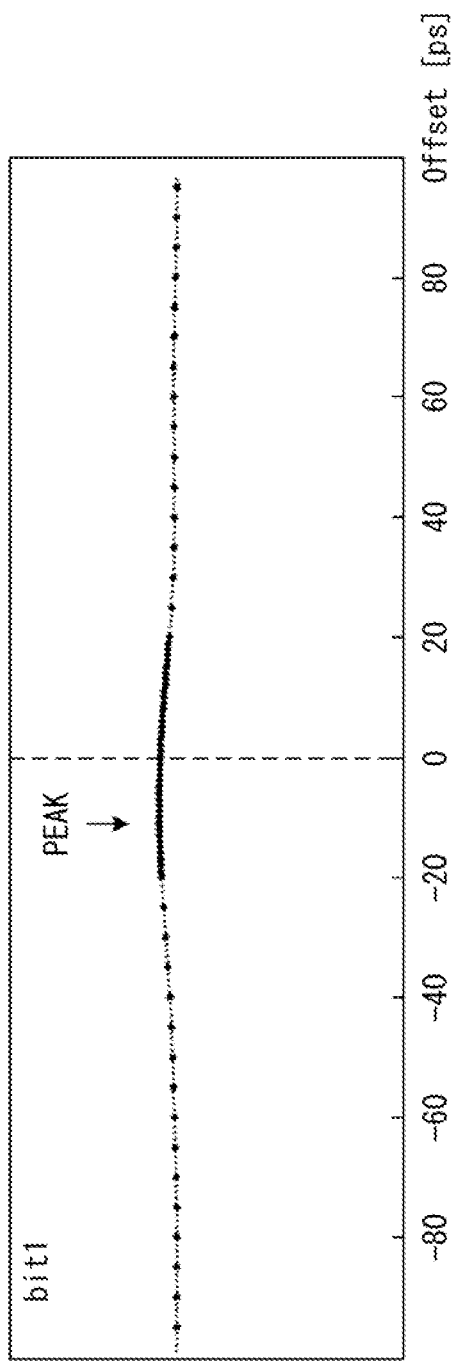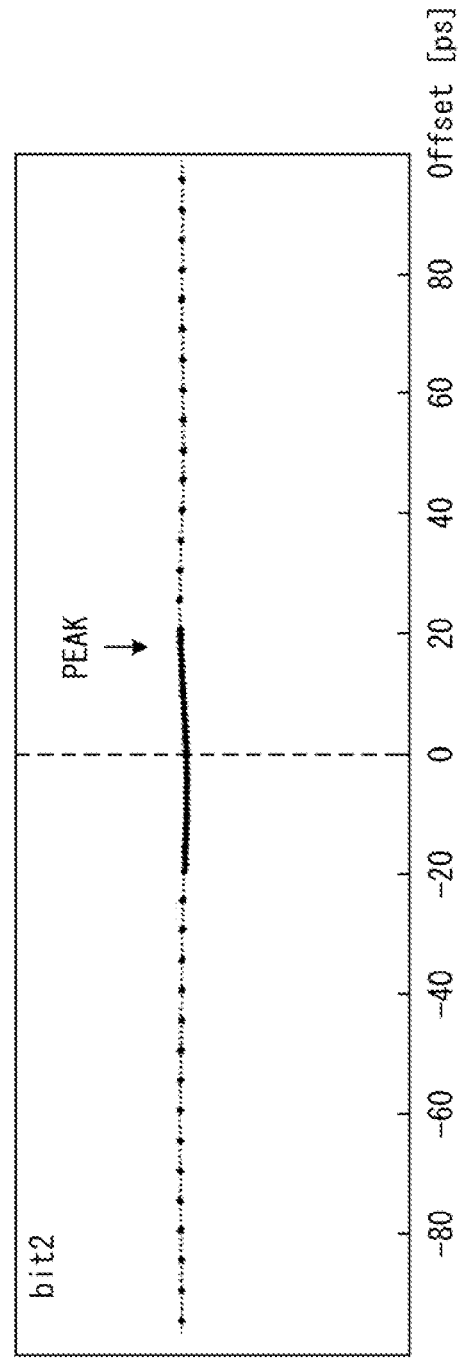

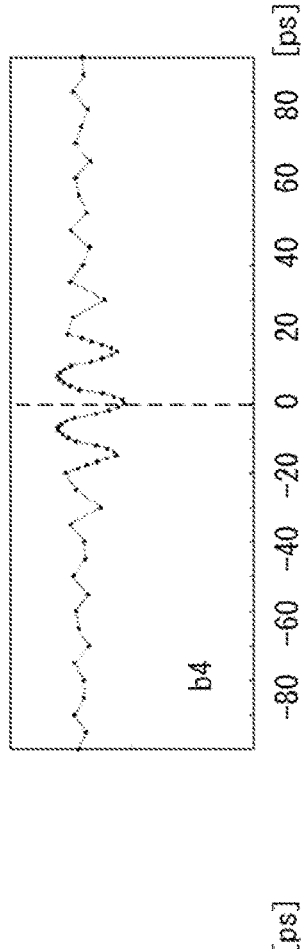
FIG. 11A
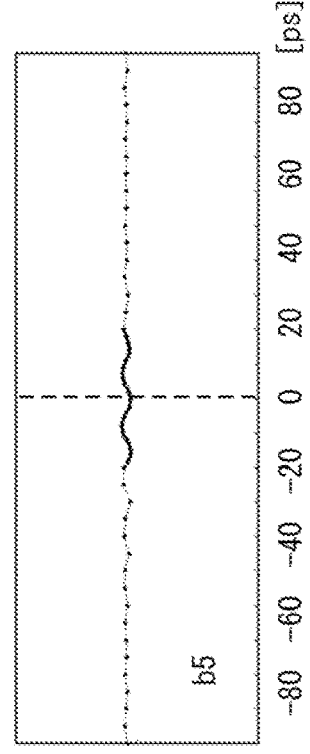
FIG. 11D
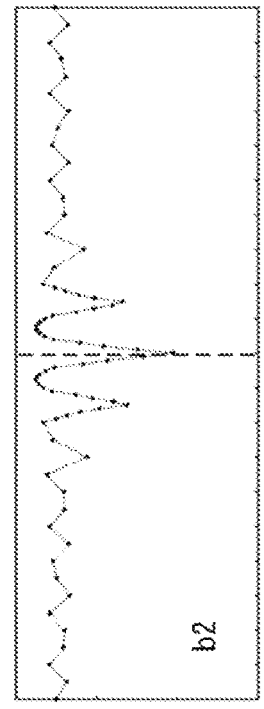
FIG. 11B
FIG. 11E
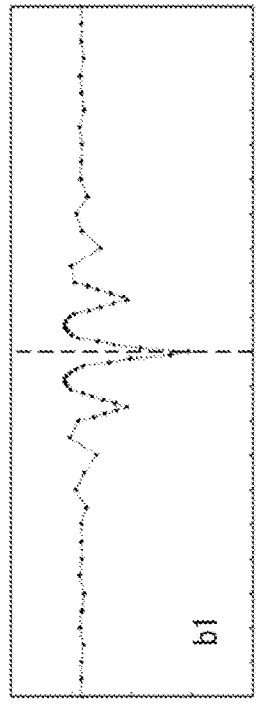
FIG. 11C
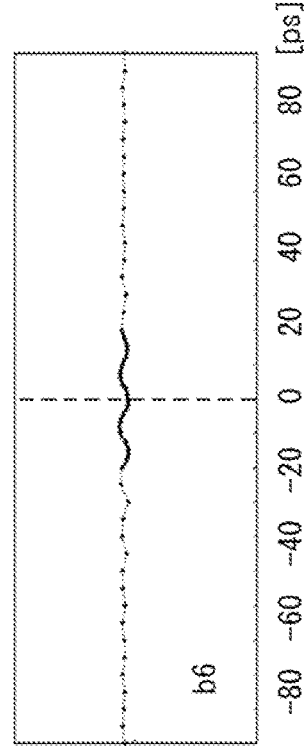
FIG. 11F
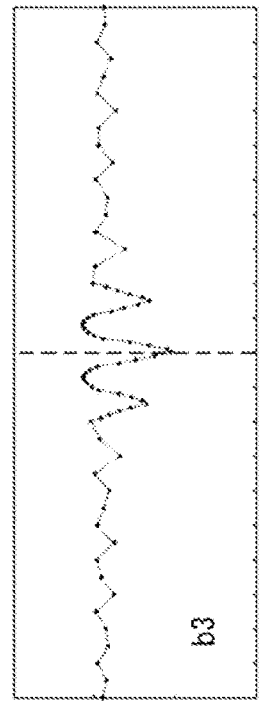

OPTICAL TRANSMITTER THAT TRANSMITS MULTI-LEVEL OPTICAL SIGNAL

CROSS-REFERENCE TO RELATED APPLICATION

This application is based upon and claims the benefit of priority of the prior Japanese Patent Application No. 2021-203720, filed on Dec. 15, 2021, the entire contents of which are incorporated herein by reference.

FIELD

The embodiments discussed herein are related to an optical transmitter that transmits a multi-level optical signal.

BACKGROUND

An optical modulator is one of key devices to realize long distance/large capacity optical transmission. The optical modulator generates a modulated optical signal by modulating continuous wave light with, for example, an electric signal corresponding to a data signal generated by a digital signal processor (DSP). An example of an optical transmitter including the optical modulator is illustrated in FIGS. 1A and 1B.

In a configuration illustrated in FIG. 1A, a data signal (digital signal) generated by a DSP is converted into an analog signal by a digital-to-analog converter (DAC). Then, an output signal of the DAC is amplified by an analog driver (linear driver) and provided to an optical modulator. The optical modulator includes an optical waveguide included in a Mach-Zehnder interferometer, and an electrode is formed in the vicinity of the optical waveguide. Continuous wave light is input to the Mach-Zehnder interferometer. Then, when an output signal of a driver is provided to the electrode, a phase of light propagating through the waveguide changes according to the signal, and a modulated optical signal indicating the data signal is output.

In this configuration, in a case of generating an optical signal in which each symbol transmits 2-bit data, the DSP outputs a 2-bit parallel signal. Since a 4-level analog signal is output from the DAC, a 4-level pulse amplitude modulation (PAM4) optical signal is generated. However, in order to acquire a sufficient optical amplitude with this configuration, an analog signal having a larger amplitude is required as a baud rate increases. Thus, power consumption of the driver increases.

This problem is alleviated by, for example, a configuration illustrated in FIG. 1B. In the configuration illustrated in FIG. 1B, an optical modulator includes an electrode with respect to each of a plurality of bits transmitted by each symbol. In the following description, each electrode to which an electrical signal indicating data is provided (that is, electrode used as a phase shifter) may be referred to as a "phase-shift segment" or simply as a "segment".

When each symbol transmits 2 bits, the optical modulator includes an electrode for a low-order bit (LSB segment) and an electrode for a high-order bit (MSB segment). Here, when it is assumed that signals having the same voltage amplitude are given to the segments, the MSB segment is twice as long as the LSB segment. Then, when a corresponding transmission bit is provided to each of the segments, a PAM4 optical signal is generated. According to this configuration, it is not necessary to increase amplitude of the electric signals provided to the optical modulator and a binary driver in which current flows only at the time of data transition can be used, whereby power consumption is reduced as compared with the configuration illustrated in FIG. 1A. Note that a modulation system illustrated in FIG. 1B is sometimes called an "optical DAC" since a digital signal is provided to the Mach-Zehnder interferometer and an analog signal is generated in an optical domain.

FIG. 2 illustrates an example of an optical transmitter including an optical DAC. In this example, an optical transmitter 100 includes a drive circuit 110 and an optical modulator 120. In addition, the optical transmitter 100 generates an optical signal in which each symbol transmits 6 bits.

The drive circuit 110 includes a signal processing circuit 111. The signal processing circuit 111 generates a drive signal for generating an optical signal in which each symbol transmits 6 bits. That is, drive signals b1 to b6 are generated by the signal processing circuit 111. The optical modulator 120 includes an optical waveguide included in a Mach-Zehnder interferometer, and electrodes (that is, phase-shift segments) are formed in the vicinity of the optical waveguide. Specifically, the optical modulator 120 includes segments S1 to S6 to which the drive signals b1 to b6 are respectively provided.

Here, it is preferable that timings at which the drive signals b1 to b6 are provided to the segments S1 to S6 are appropriately adjusted. Specifically, a delay of each of the drive signals b1 to b6 is configured according to propagation time of light from an input port of the Mach-Zehnder interferometer to each of the segments S1 to S6. Thus, the drive circuit 110 includes a delay circuit 112 that adjusts the timings at which the drive signals b1 to b6 arrive at the segments S1 to S6. That is, the delay circuit 112 delays the drive signals b1 to b6 in such a manner that the drive signals b1 to b6 are provided to the segments S1 to S6 at appropriate timing.

Note that a drive device to drive an optical modulator for a phase modulation scheme has been proposed (for example, Japanese Laid-Open Patent Publication No. 2010-243767). In addition, a control device that detects a phase shift between signals of a drive system of an optical modulator and performs feedback control has been proposed (for example, Japanese Laid-Open Patent Publication No. 2003-279912). Furthermore, an optical modulator including a plurality of phase-shift segments has been proposed (for example, Japanese Laid-Open Patent Publication No. 2021-071616, and U.S. Pat. No. 7,787,713).

As described above, an optical modulator including a plurality of phase-shift segments has been known. However, in related art, it is not easy to appropriately adjust timings of a plurality of drive signals provided to a plurality of phase-shift segments. In addition, during operation of an optical transmitter, it is difficult to adaptively control delay amounts of the drive signals according to a temperature change or a voltage fluctuation of an optical device/electric device.

FIGS. 3A-3C illustrate examples of waveform deterioration caused by deviations in a delay amount of a drive signal in the optical transmitter 100 illustrated in FIG. 2. Here, a waveform of an optical signal output from the optical modulator 120 of when the delays of the drive signals b1 to b6 are appropriately adjusted is illustrated in FIG. 3A. In this case, an opening of an eye pattern is large at a sampling point, and a plurality of signal levels can be determined.

FIG. 3B illustrates a waveform of when a delay amount of the drive signal b1 shifts from an optimum value by 5 ps, and FIG. 3C illustrates a waveform of when the delay amount of the drive signal b1 shifts from the optimum value by 10 ps. Here, the drive signal b1 indicates a value of the most significant bit among the 6 bits transmitted by each symbol. As described above, when a delay amount of a drive signal shifts from an optimum value, an opening of an eye pattern becomes small at a sampling point. That is, a waveform of an optical signal is deteriorated.

SUMMARY

According to an aspect of the embodiments, an optical transmitter includes: a signal processing circuit configured to generate N drive signals for generating a modulated optical signal, a symbol rate of the modulated optical signal being fs and each symbol of the modulated optical signal transmitting N bits, N being an integer equal to or larger than 2; an optical modulator configured to include a Mach-Zehnder interferometer and N phase-shift segments each of which shifts a phase of light propagating through an optical path of the Mach-Zehnder interferometer according to the N drive signals, and generate the modulated optical signal according to the N drive signals; an optical filter configured to remove, from output light of the optical modulator, a frequency component in a range of ±fs/2 with respect to a center frequency of the modulated optical signal, and extract at least a part of other frequency components; and a delay circuit configured to control timing of the N drive signals in such a manner as to reduce optical power of the frequency component extracted by the optical filter.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 6A and 6B illustrate examples of changes in a monitor signal with respect to timing offsets of drive signals;

FIGS. 10A-10F and 11A-11F illustrate examples of changes in a monitor signal with respect to timing offsets of drive signals in the embodiment of the present invention;

DESCRIPTION OF EMBODIMENTS

Figure 1A:
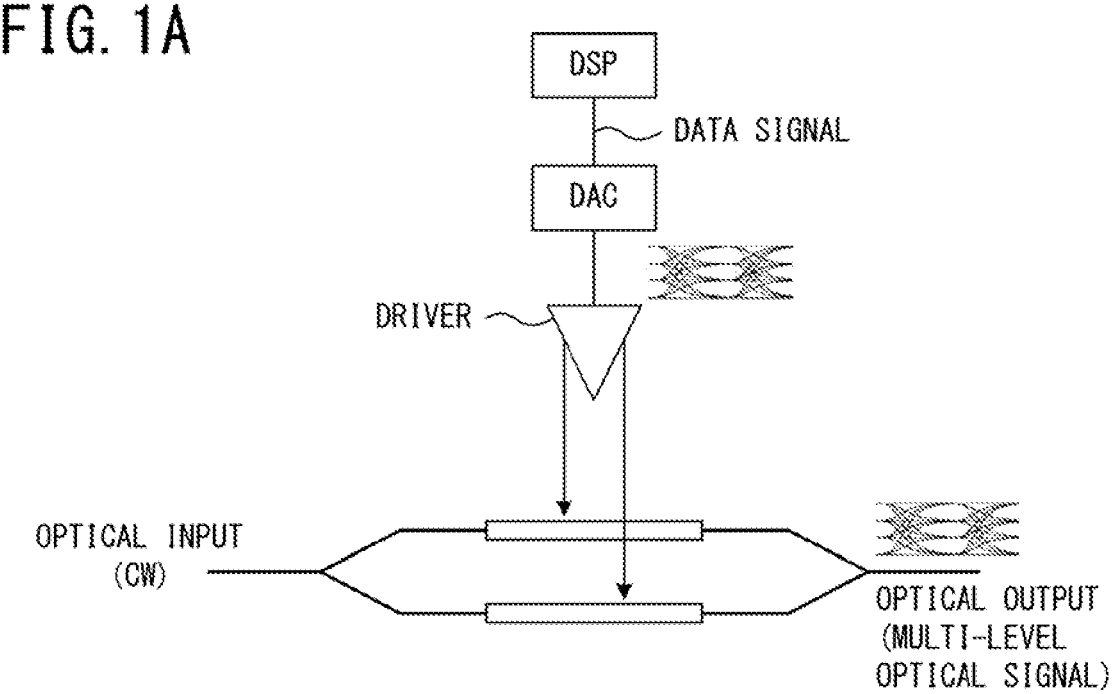
FIGS. 1A and 1B illustrate examples of optical transmitters including an optical modulator.
Figure 1B:
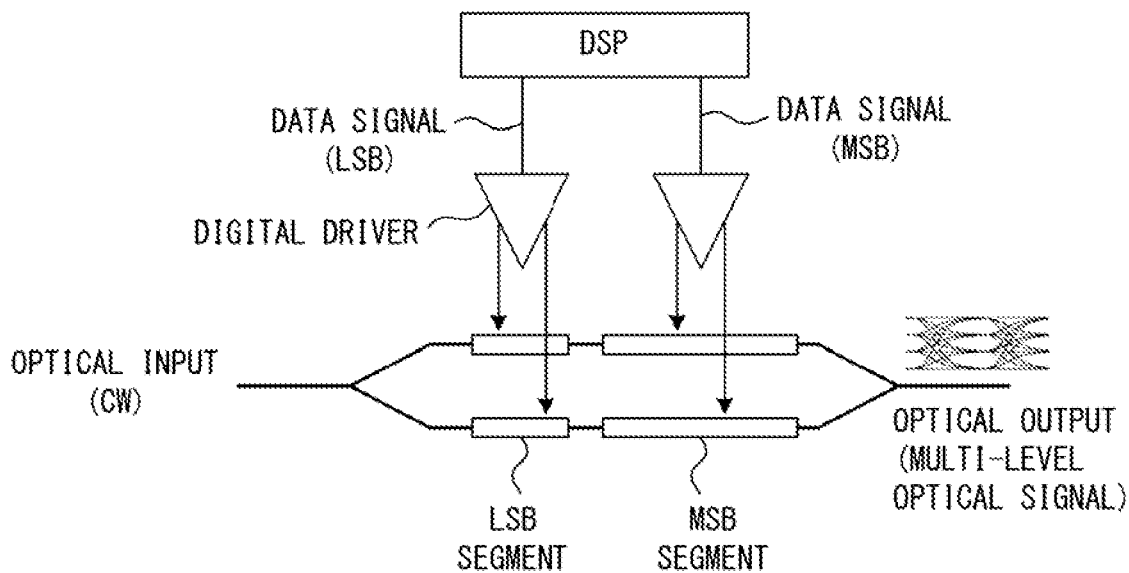
Figure 2:
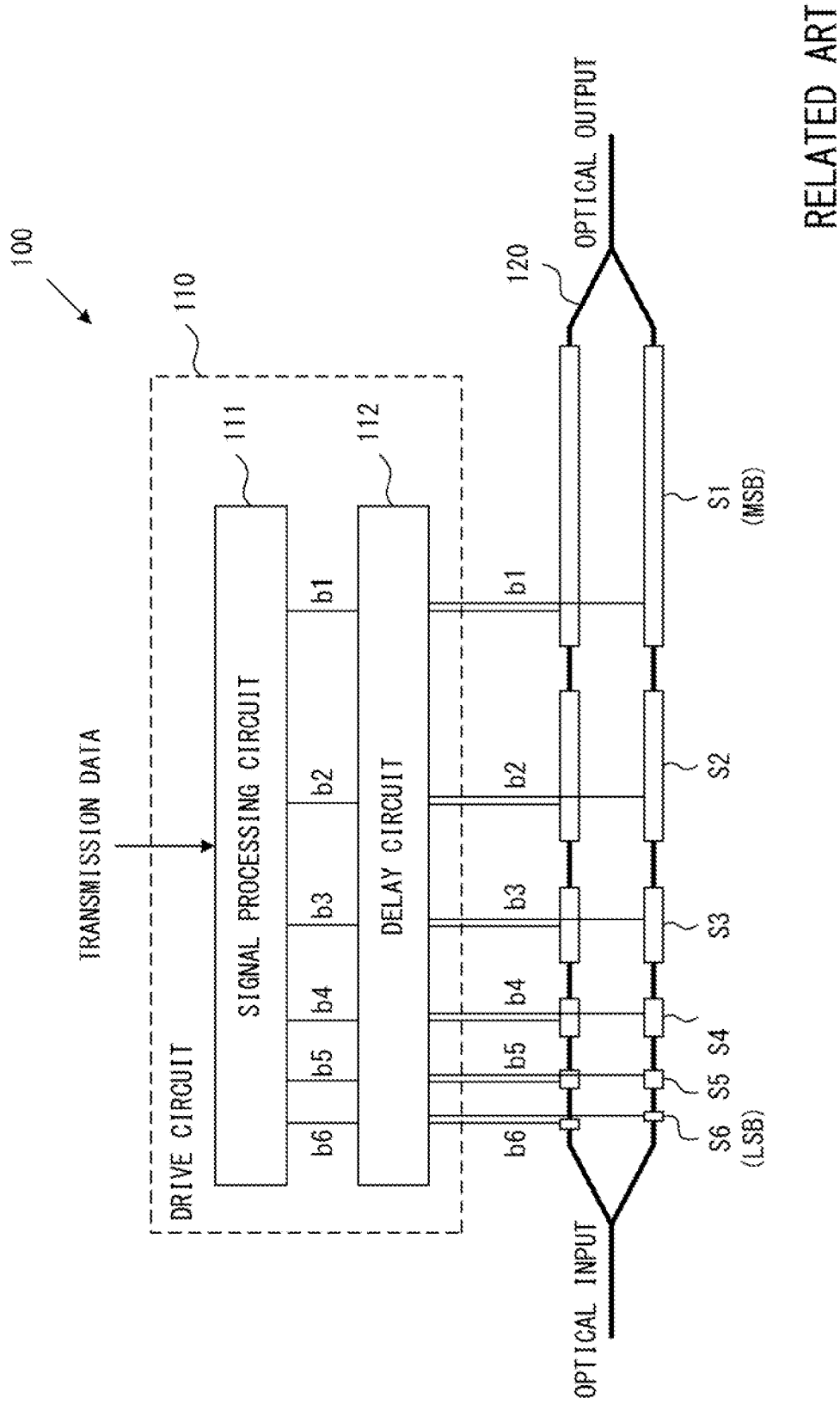
FIG. 2 illustrates an example of an optical transmitter including an optical DAC.
Figure 3:
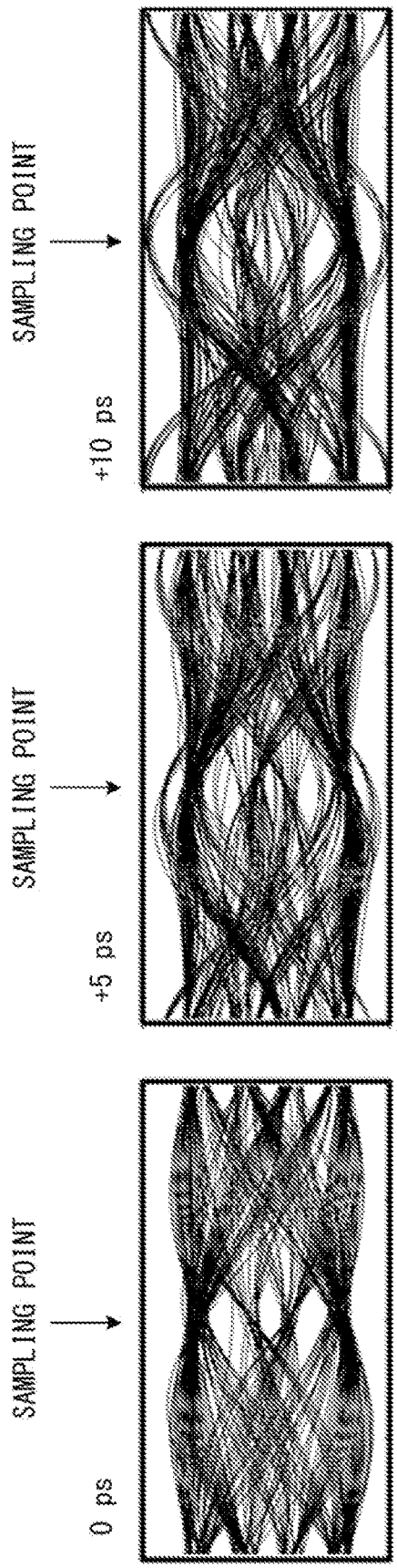
FIGS. 3A-3C illustrate examples of waveform deterioration caused by shifts in a delay amount of a drive signal.
Figure 4:
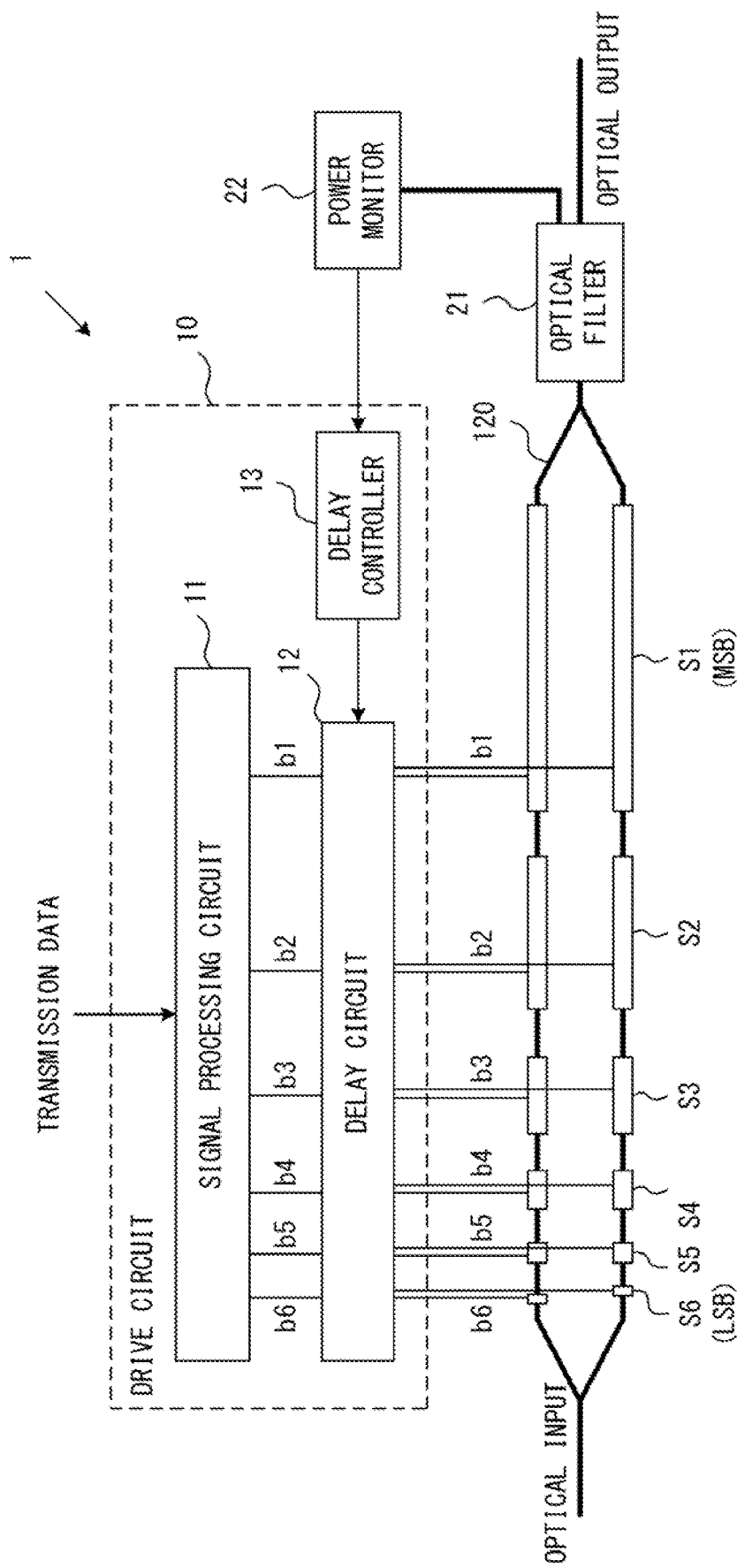
FIG. 4 illustrates an example of an optical transmitter having a function of adaptively controlling a delay of a drive signal.

FIG. 4 illustrates an example of an optical transmitter having a function of adaptively controlling a delay of a drive signal. In this example, an optical transmitter 1 includes a drive circuit 10, an optical modulator 120, an optical filter 21, and a power monitor 22. Similarly to the optical transmitter 100 illustrated in FIG. 2, the optical transmitter 1 generates an optical signal in which each symbol transmits 6 bits.

The drive circuit 10 includes a signal processing circuit 11, a delay circuit 12, and a delay controller 13. The signal processing circuit 11 generates a drive signal for generating an optical signal in which each symbol transmits 6 bits. That is, drive signals b1 to b6 are generated by the signal processing circuit 11. In this example, the drive signal b1 indicates the most significant bit (MSB) and the drive signal b6 indicates the least significant bit (LSB).

The optical modulator 120 includes an optical waveguide configuring a Mach-Zehnder interferometer, and electrodes (that is, phase-shift segments) are formed in the vicinity of the optical waveguide. Specifically, the optical modulator 120 includes segments S1 to S6 to which the drive signals b1 to b6 are respectively provided. The segments S1 to S6 are sequentially provided between an input port and an output port of the Mach-Zehnder interferometer. Furthermore, lengths of the segments S1 to S6 are different from each other. Specifically, the lengths of the segments S5, S4, S3, S2, and S1 are two times, four times, eight times, 16 times, and 32 times the length of the segment S6, respectively. With this configuration, PAM in which each symbol transmits 6 bits is realized by the optical DAC.

Figure 5:
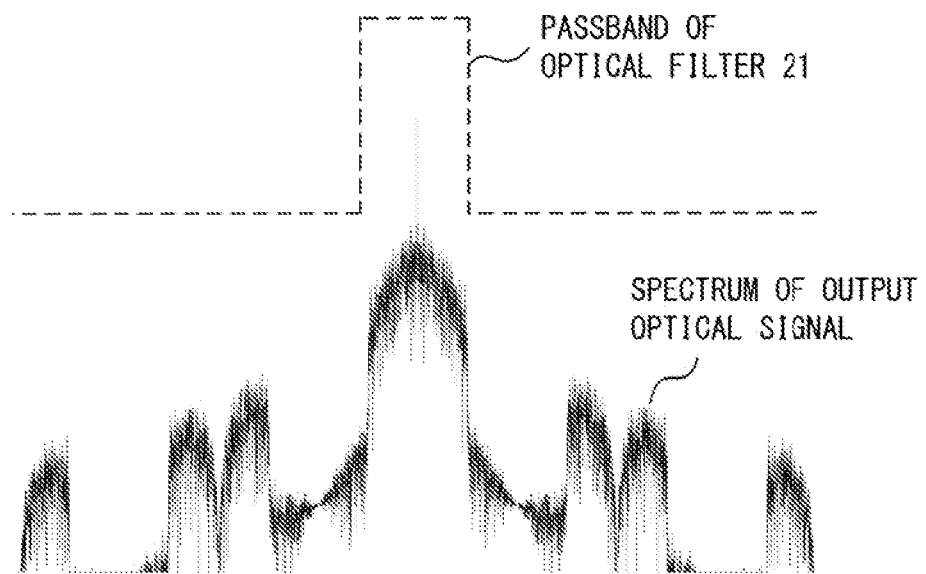
FIG. 5 illustrates a characteristic of an optical filter illustrated in FIG. 4.

The optical filter 21 is provided on an output side of the optical modulator 120, and filters output light of the optical modulator 120. Specifically, as illustrated in FIG. 5, the optical filter 21 extracts a main signal component from the output light of the optical modulator 120. Here, for example, when a symbol rate fs of a transmission signal is 50 Gsymbols/second (or 50 Gbaud), a width of a passband of the optical filter 21 is about 50 GHz. Note that it is assumed in the description of this specification that a Nyquist filter having a root raised cosine shape is applied to a transmission signal in the signal processing circuit and a sampling frequency for each bit is 100 Gsamples/second.

The power monitor 22 includes a photo detector, and converts light extracted by the optical filter 21 into an electric signal. This electric signal indicates power (or intensity) of the light extracted by the optical filter 21. Note that the electric signal generated by the power monitor 22 may be referred to as a "monitor signal" in the following description.

The delay circuit 12 delays each of the drive signals b1 to b6 according to a delay instruction given from the delay controller 13. Based on the monitor signal, the delay controller 13 generates the delay instruction given to the delay circuit 12. Here, in the example illustrated in FIG. 4 and FIG. 5, the monitor signal indicates power of the main signal component included in the output light of the optical modulator 120. In addition, it is considered that the power of the main signal component included in the output light increases when a high-quality modulated optical signal is generated. Thus, the delay controller 13 generates a delay instruction for increasing the power of the main signal component indicated by the monitor signal. Then, the delay circuit 12 delays each of the drive signals b1 to b6 according to this delay instruction. As a result, the power of the main signal component included in the output light of the optical modulator 120 is maximized. However, even when the power of the main signal component is maximized, quality of the modulated optical signal is not always optimized.

FIGS. 6A and 6B illustrate examples of changes in the monitor signal with respect to timing offsets of the drive signals. Note that a vertical axis of each graph indicates the monitor signal (that is, power of the main signal component). A horizontal axis indicates an offset of a delay amount with respect to an optimum state. Specifically, an offset of a delay amount of the drive signal b1 in a state in which delay amounts of the drive signals b2 to b6 are optimized is illustrated in FIG. 6A. In addition, an offset of the delay amount of the drive signal b2 in a state in which the delay amounts of the drive signals b1, and b3 to b6 are optimized is illustrated in FIG. 6B.

Also in cases illustrated in FIGS. 6A and 6B, when the offset becomes zero, the quality of the modulated optical signal (such as width of an opening of an eye pattern) is optimized. Here, the optical transmitter 1 illustrated in FIG. 4 and FIG. 5 controls the delay amounts of the drive signals b1 to b6 in such a manner as to maximize the monitor signal. As a result, for example, in the case illustrated in FIG. 6A, the delay amount of the drive signal b1 is controlled to a state of having an offset of about −10 ps. Furthermore, in the case illustrated in FIG. 6B, the delay amount of the drive signal b2 is controlled to a state of having an offset of about +20 ps. That is, in the examples illustrated in FIGS. 6A and 6B, in any of the cases, a skew between the drive signals cannot be minimized, and the quality of the modulated optical signal may not be optimized. Note that a position where a peak of the monitor signal appears may depend on a pattern of transmission data.

As described above, it may not be possible to optimize the quality of the modulated optical signal by the feedback control that maximizes the power of the main signal component included in the output light of the optical modulator 120. Thus, an optical transmitter according to the embodiment of the present invention controls delay amounts of a plurality of drive signals by using optical power of a frequency component other than a main signal component included in output light of an optical modulator.

Figure 7:
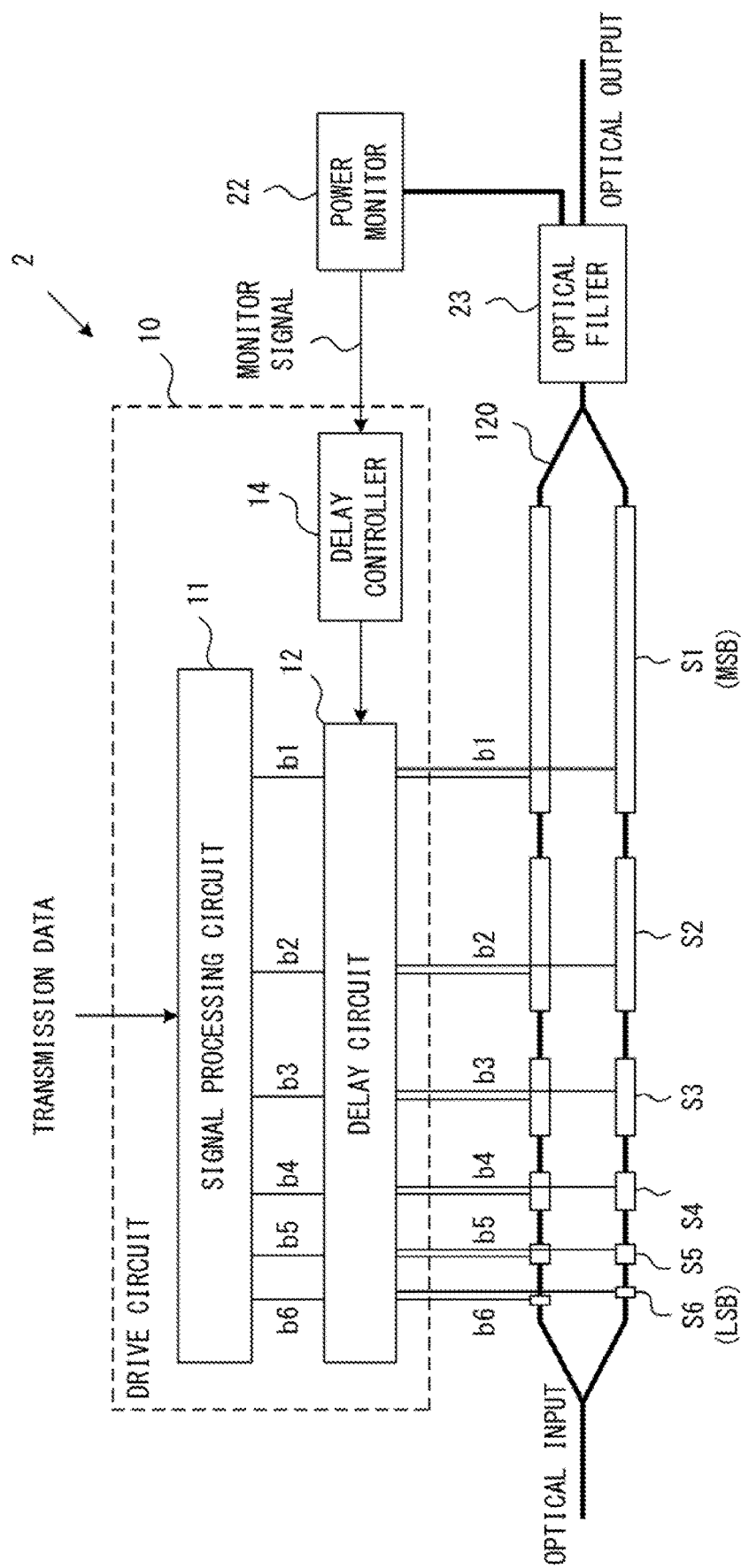
FIG. 7 illustrates an example of an optical transmitter according to an embodiment of the present invention.

FIG. 7 illustrates an example of the optical transmitter according to the embodiment of the present invention. An optical transmitter 2 according to the embodiment of the present invention includes a drive circuit 10, an optical modulator 120, an optical filter 23, and a power monitor 22. That is, a configuration of the optical transmitter 2 is substantially the same as that of the optical transmitter 1 illustrated in FIG. 4. However, the optical transmitter 2 includes the optical filter 23 instead of the optical filter 21 illustrated in FIG. 4. Note that the optical transmitter 2 may include another circuit or device not illustrated in FIG. 7.

The signal processing circuit 11 generates, from transmission data, drive signals b1 to b6 for generating an optical signal in which each symbol transmits 6 bits. Here, the signal processing circuit 11 includes a Nyquist filter, and the drive signals are output via the Nyquist filter. The Nyquist filter is a low-pass filter and a cutoff frequency of the filter is "½ fs" when a symbol rate is "fs". Thus, for example, when a symbol rate of a transmission signal is 50 Gsymbols/second (or 50 Gbaud), the cutoff frequency of the Nyquist filter is 25 GHz. In this case, frequency components higher than 25 GHz are removed from the drive signals b1 to b6. However, the Nyquist filter is an ideal low-pass filter, and is actually implemented by, for example, a low-pass filter (or roll-off filter) using a digital filter such as a finite impulse response (FIR) filter. In this case, a desired cutoff frequency can be acquired when a coefficient of each tap of the digital filter is configured appropriately. In addition, a sampling rate in this digital filter is assumed to be 100 Gsamples/second that is twice as high as the symbol rate, and each bit signal corresponding to the sampling rate is given to the delay circuit.

Note that the signal processing circuit 11 is implemented by a hardware circuit such as a digital signal processor (DSP), for example. However, a part or all of functions of the signal processing circuit 11 may be implemented by software. In this case, the signal processing circuit 11 is implemented by a processor executing a software program.

The delay circuit 12 delays each of the drive signals b1 to b6 according to a delay instruction given from a delay controller 14. Based on the monitor signal, the delay controller 14 generates the delay instruction given to the delay circuit 12. Note that the monitor signal and operation of the delay controller 14 will be described later.

The drive signals b1 to b6 generated by the drive circuit 10 are provided to the optical modulator 120. Here, configurations of the optical modulator 120 are substantially the same in FIG. 4 and FIG. 7. That is, also in the optical transmitter 2 illustrated in FIG. 7, the optical modulator 120 includes an optical waveguide that forms a Mach-Zehnder interferometer, and segments S1 to S6 are provided in the vicinity the optical waveguide. The segments S1 to S6 are sequentially provided between an input port and an output port of the Mach-Zehnder interferometer, as described above. Furthermore, lengths of the segments S1 to S6 are different from each other in this example. Specifically, the lengths of the segments S5, S4, S3, S2, and S1 are two times, four times, eight times, 16 times, and 32 times the length of the segment S6, respectively. With this configuration, PAM in which each symbol transmits 6 bits is realized by the optical DAC.

During operation of the optical transmitter 2, continuous wave light is input to the optical modulator 120, and the drive signals b1 to b6 are respectively provided to the segments S1 to S6. Then, the continuous wave light is modulated by the drive signals b1 to b6, and a PAM optical signal is generated.

Figure 8:
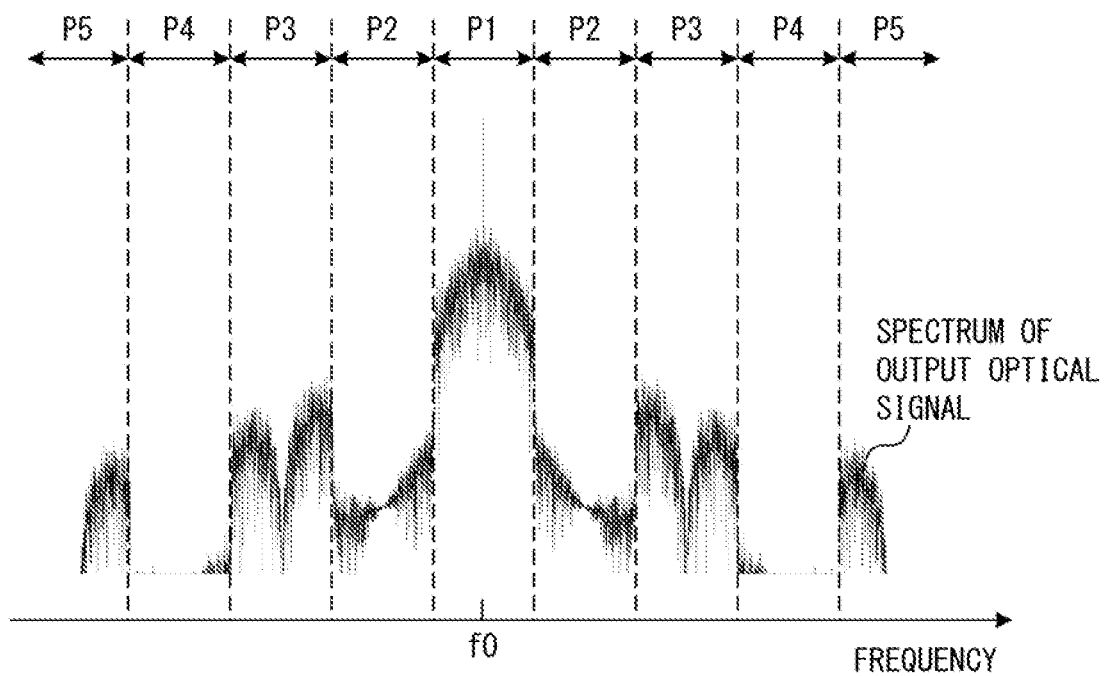
FIG. 8 illustrates an example of a spectrum of output light of an optical modulator.

FIG. 8 illustrates an example of a spectrum of output light of the optical modulator 120. A horizontal axis of the graph indicates a frequency, and f0 indicates a center frequency of an optical signal. Here, the drive signals b1 to b6 are filtered by a Nyquist filter with a cutoff frequency being "½ fs". Thus, the output light of the optical modulator 120 has a signal component in a frequency range of "f0±fs/2". In the following description, this frequency range may be referred to as a "main signal range P1".

In a frequency range outside the main signal range P1, a signal component is suppressed. However, due to a characteristic determined by the Nyquist filter and the sampling rate, the signal component periodically appears at a frequency spacing corresponding to the sampling rate, as illustrated in FIG. 8. Specifically, frequency ranges (P2, P4, . . . ) in each of which the signal component is suppressed and frequency ranges (P3, P5, . . . ) each of which includes the signal component alternately appear on both sides of the main signal range P1. Note that the period at which the signal component appears is fs. That is, a bandwidth of each of the frequency ranges P2, P3, P4, P5, . . . corresponds to "fs".

The output light of the optical modulator 120 is filtered by the optical filter 23. Then, a frequency component extracted by the optical filter 23 is guided to the power monitor 22.

Figure 9:
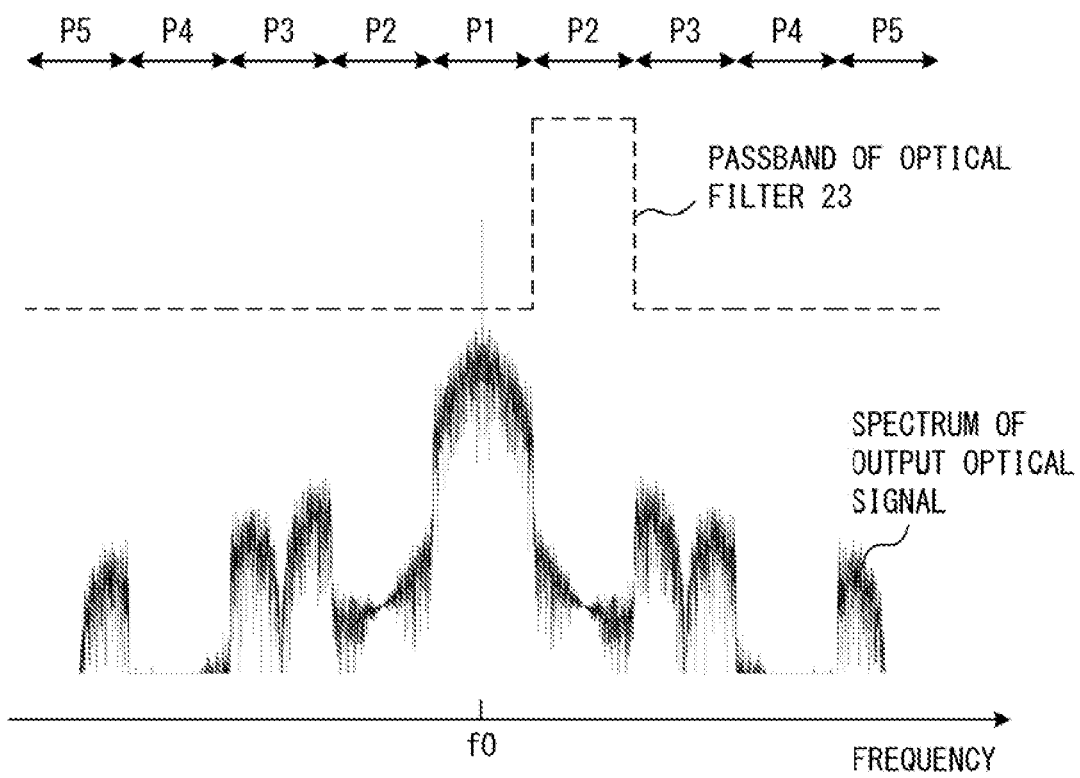
FIG. 9 illustrates an example of a characteristic of an optical filter implemented on the optical transmitter illustrated in FIG. 7.

FIG. 9 illustrates an example of a characteristic of the optical filter 23 illustrated in FIG. 7. In this example, the optical filter 23 has a passband with for the frequency range P2 that is provided adjacent to the main signal range P1. A width of this passband corresponds to the symbol rate of the transmission signal. That is, the optical filter 23 extracts a frequency component in a range between a first frequency separated by fs/2 from a center frequency of a modulated optical signal and a second frequency separated by 3 fs/2 from the center frequency. For example, when the symbol rate of the transmission signal is 50 Gsymbols/second (or 50 Gbaud), the width of the passband of the optical filter 23 is about 50 GHz.

The power monitor 22 converts light extracted by the optical filter 23 into an electric signal. This electric signal indicates power (or intensity) of the light extracted by the optical filter 23. The electric signal generated by the power monitor 22 may be referred to as a "monitor signal" in the following description.

Based on the monitor signal output from the power monitor 22, the delay controller 14 generates the delay instruction given to the delay circuit 12. The monitor signal indicates power of the light extracted by the optical filter 23. Specifically, the monitor signal indicates optical power in the frequency range P2 in which the signal component is suppressed. Note that it is considered that the optical power of the frequency range P2 in which the signal component is suppressed decreases when a high-quality modulated optical signal is generated.

FIGS. 10A-10F illustrate examples of changes in the monitor signal with respect to timing offsets of the drive signals in the embodiment of the present invention. Note that a vertical axis of each graph indicates the monitor signal (that is, power of light in the frequency range P2 extracted by the optical filter 23). A horizontal axis indicates an offset of a delay amount with respect to an optimum state.

Figure 10A:
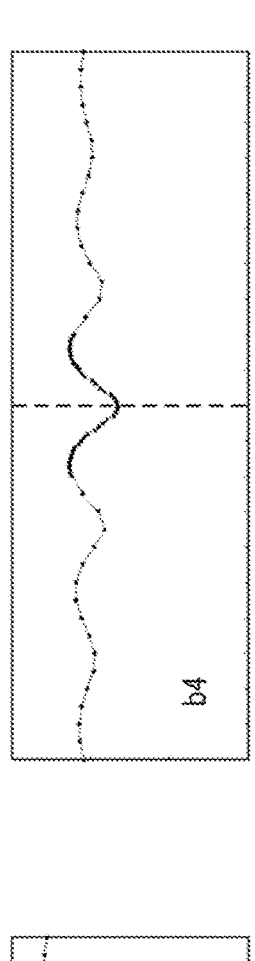

The monitor signal with respect to an offset of a delay amount of the drive signal b1 in a state in which delay amounts of the drive signals b2 to b6 are optimized is illustrated in FIG. 10A. The monitor signal has the minimum when the offset of the delay amount of the drive signal b1 is zero. Then, as the offset increases, the monitor signal also increases.

Figure 10B:
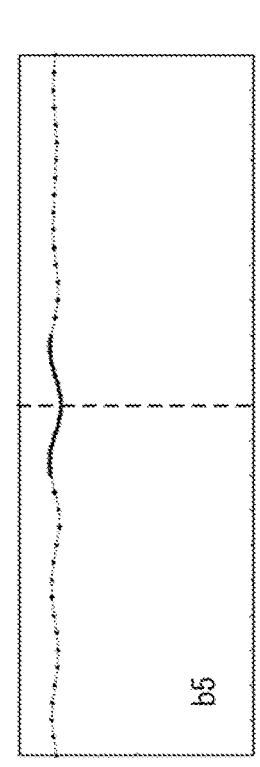
Figure 10C:
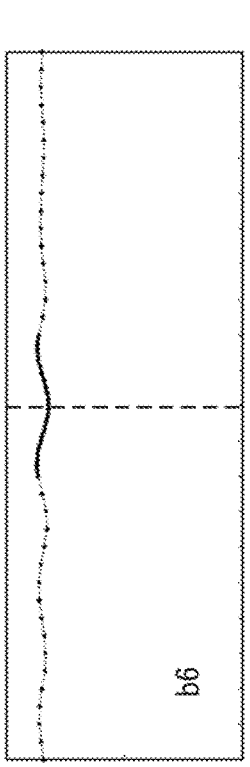
Figure 10D:
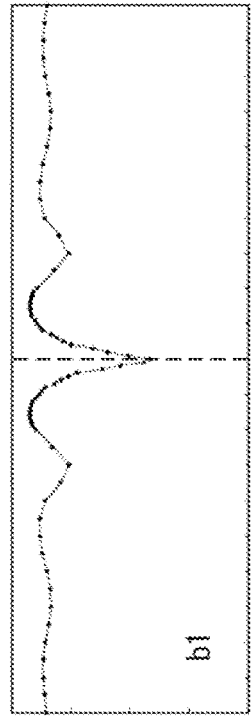
Figure 10E:
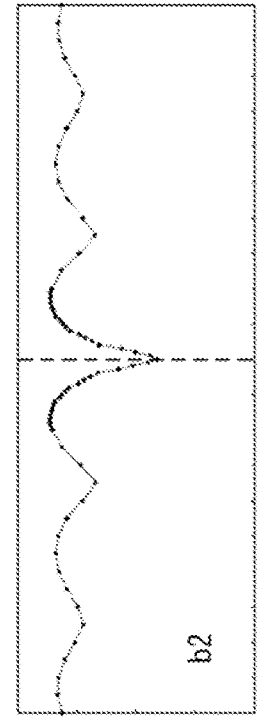
Figure 10F:
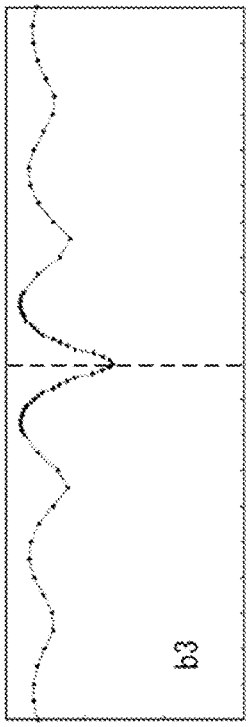

The monitor signal with respect to an offset of the delay amount of the drive signal b2 in a state in which the delay amounts of the drive signals b1 and b3 to b6 are optimized is illustrated in FIG. 10B. The monitor signal with respect to an offset of the delay amount of the drive signal b3 in a state in which the delay amounts of the drive signals b1 to b2 and b4 to b6 are optimized is illustrated in FIG. 10C. The monitor signal with respect to an offset of the delay amount of the drive signal b4 in a state in which the delay amounts of the drive signals b1 to b3 and b5 to b6 are optimized is illustrated in FIG. 10D. The monitor signal with respect to an offset of the delay amount of the drive signal b5 in a state in which the delay amounts of the drive signals b1 to b4 and b6 are optimized is illustrated in FIG. 10E. The monitor signal with respect to an offset of the delay amount of the drive signal b6 in a state in which the delay amounts of the drive signals b1 to b5 are optimized is illustrated in FIG. 10F.

As described above, in any of the cases, the monitor signal has the minimum when the offset of the delay amount of the drive signal is zero. Then, as the offset increases, the monitor signal also increases. Thus, when the feedback control is performed in such a manner that the monitor signal is decreased, it is considered that timings of the drive signals b1 to b6 are optimized.

Thus, the delay controller 14 generates a delay instruction of decreasing the monitor signal output from the power monitor 22. Preferably, the delay controller 14 generates a delay instruction that minimizes the monitor signal. The delay circuit 12 delays each of the drive signals b1 to b6 according to this delay instruction. As a result, as illustrated in FIGS. 10A-10F, the timings of the drive signals b1 to b6 are optimized. That is, a skew between the drive signals b1 to b6 is minimized. Thus, quality of the optical signal output from the optical modulator 120 (such as width of an opening of an eye pattern) is improved.

Note that although the passband of the optical filter 23 may be configured in the frequency range P2 on a higher frequency side of the center frequency f0 of the optical signal in FIG. 9, the passband may be configured in the frequency range P2 on a lower frequency side of the center frequency f0 of the optical signal. In addition, the optical filter 23 may include two passbands, one of which being provided in the frequency range P2 on a higher frequency and the other of which being provided in the frequency range P2 on a lower frequency.

In addition, the passband of the optical filter 23 may be configured in another frequency range. For example, the passband of the optical filter 23 may be configured in the frequency range P3. Also in this case, as illustrated in FIGS. 11A-11F, when an offset of a delay amount of a drive signal is zero, the monitor signal has the minimum. Then, as the offset increases, the monitor signal also increases. Thus, also in this case, when the feedback control is performed in such a manner that the monitor signal is decreased, it is considered that timings of the drive signals b1 to b6 are optimized.

Furthermore, the passband of the optical filter 23 may be configured in an arbitrary frequency range other than the main signal range P1. In other words, the optical filter 23 removes, from the output light of the optical modulator 120, frequency components in a range of ±fs/2 with respect to the center frequency f0 of the modulated optical signal, and extracts at least a part of other frequency components.

Figure 12A:
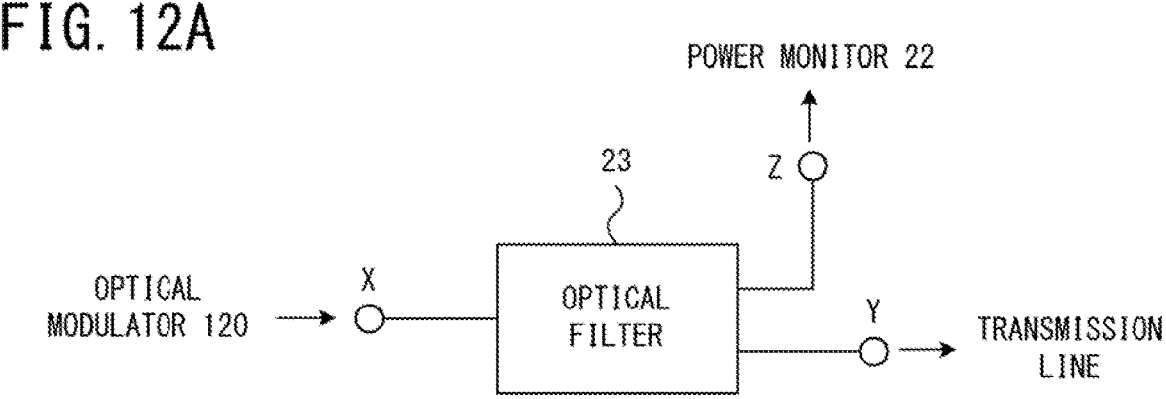
FIGS. 12A and 12B illustrate a variation of an optical filter.
Figure 12B:
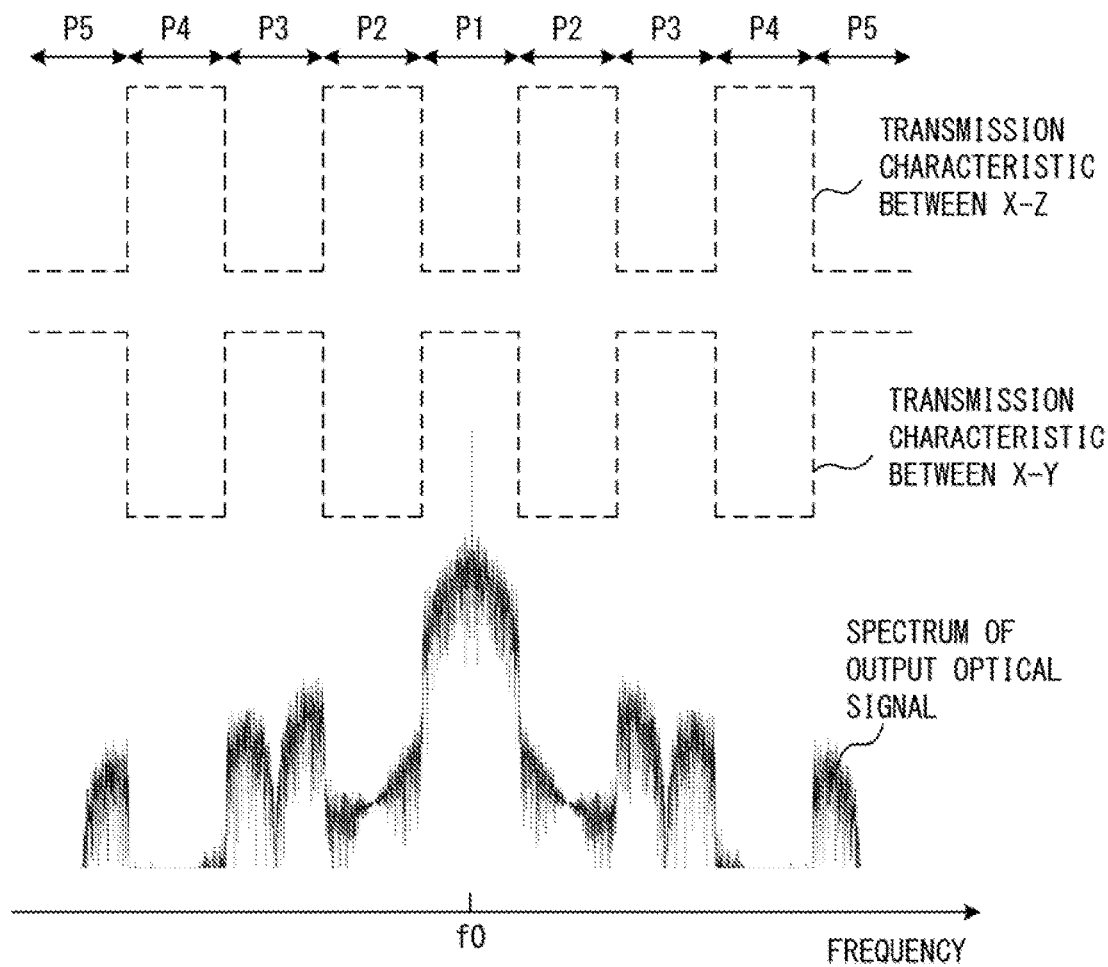

FIGS. 12A and 12B illustrate a variation of the optical filter 23. In this example, the optical filter 23 includes an input port X, an output port Y, and an output port Z, as illustrated in FIG. 12A. The output light of the optical modulator 120 is guided to the input port X. The output port Y is connected to an optical transmission line. Output light of the output port Z is guided to the power monitor 22.

The optical filter 23 has a periodic transmission characteristic as illustrated in FIG. 12B. That is, the optical filter 23 alternately has passbands and block bands at fs spacing. A width of each passband corresponds to the symbol rate of the transmission signal, and a width of each block band also corresponds to the symbol rate of the transmission signal. For example, when the symbol rate of the transmission signal is 50 Gsymbols/second (or 50 Gbaud), the width of each passband and the width of each stopband are 50 GHz. In addition, a transmission characteristic between the input port X and the output port Y and a transmission characteristic between the input port X and the output port Z are inverted from each other.

Between the input port X and the output port Y, the passbands are configured in the frequency ranges where the signal component are transmitted (P1, P3, P5, . . . ), and the block bands are configured in the frequency ranges where the signal component are suppressed (P2, P4, . . . ). Thus, the modulated optical signal generated by the optical modulator 120 is output to the optical transmission line. On the other hand, between the input port X and the output port Z, the block bands are configured in the frequency ranges where the signal component are transmitted (P1, P3, P5, . . . ), and the passbands are configured in the frequency ranges where the signal component are suppressed (P2, P4, . . . ). Thus, a frequency component in the frequency ranges where the signal component is suppressed (P2, P4, . . . ) is guided to the power monitor 22. Note that a configuration of the optical filter 23 illustrated in FIG. 12A is described in, for example, T. Akiyama et al., Optics Express vol. 29 pp. 7966-7985 (2021) "Cascaded AMZ triplets: a class of demultiplexers having a monitor and control scheme enabling dense WDM on Si nano-waveguide PICs with ultralow crosstalk and high spectral efficiency".

Figure 13:
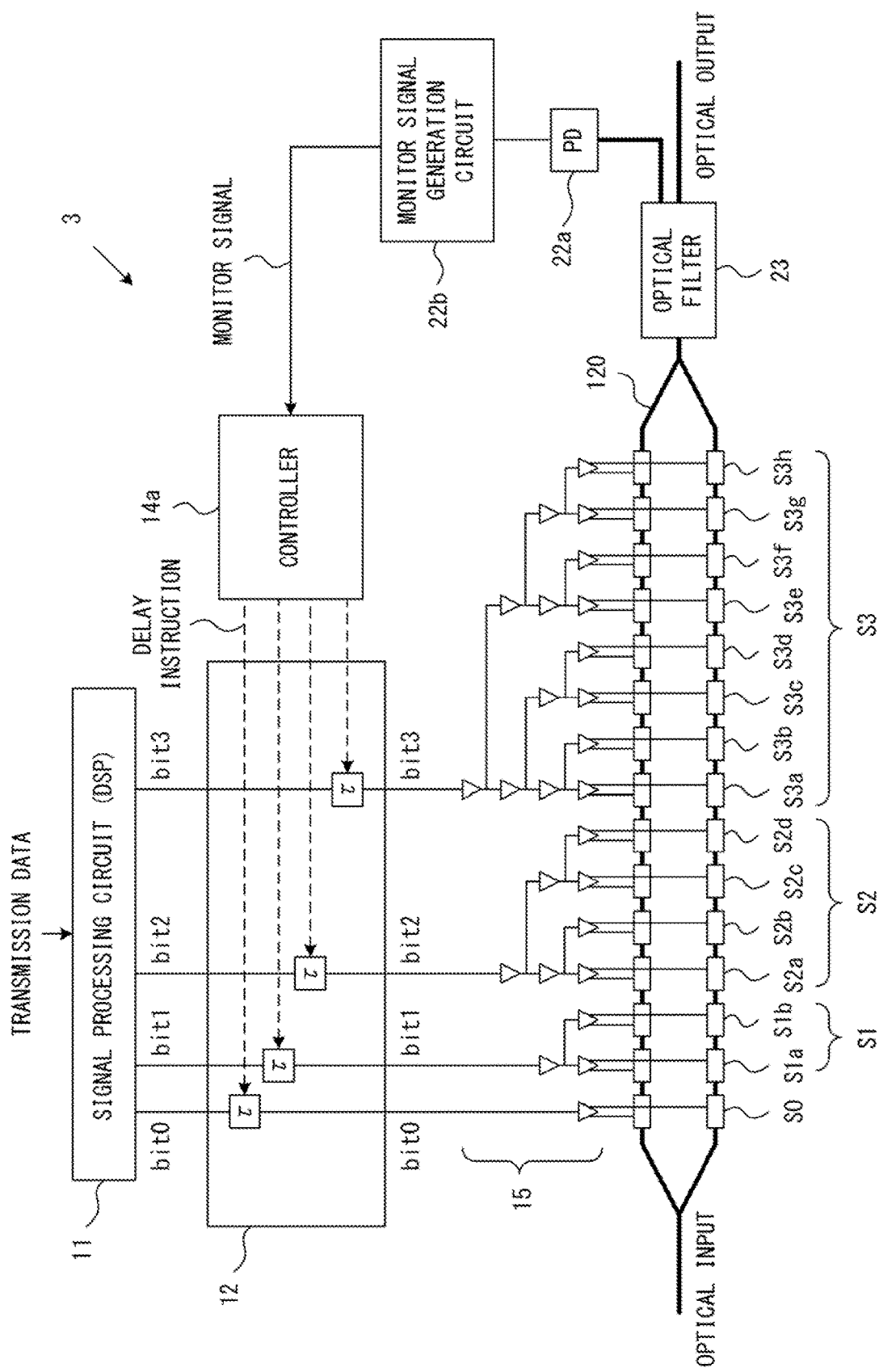
FIG. 13 illustrates an example of the optical transmitter.

FIG. 13 illustrates an example of an optical transmitter. In this example, an optical transmitter 3 generates an optical signal in which each symbol transmits 4 bits. Thus, a signal processing circuit 11 generates drive signals bit0 to bit3. The drive signals bit0 to bit3 are respectively provided to segments S0 to S3 of an optical modulator 120 via a delay circuit 12 and a driver circuit 15. Here, the segment S1 includes two sub-segments S1$a$ to S1$b$, the segment S2 includes four sub-segments S2$a$ to S2$d$, and the segment S3 includes eight sub-segments S3$a$ to S3$h$. In addition, lengths of the segment S0, and the sub-segments S1$a$ to S1$b$, S2$a$ to S2$d$, and S3$a$ to S3$h$ are the same. Then, the drive signal bit0 is provided to the segment S0, the drive signal bit1 is provided to the sub-segments S1$a$ to S1$b$, the drive signal bit2 is provided to the sub-segments S2$a$ to S2$d$, and the drive signal bit3 is provided to the sub-segments S3$a$ to S3$h$. Note that with respect to controlling of a phase of light propagating through an optical path, increasing the number of segments by K times is equivalent to increasing a length of a segment by K times.

Figure 14:
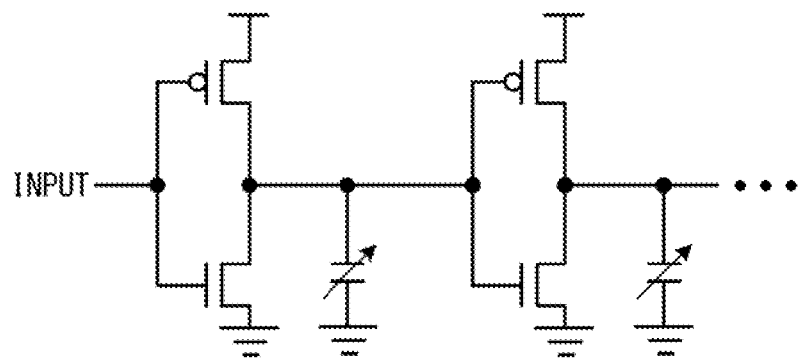
FIG. 14 illustrates an example of a variable delay element.

The delay circuit 12 includes a variable delay element $\tau$ that delays the drive signal. That is, the variable delay element $\tau$ is provided for each of the drive signals bit0 to bit3. Delay time of each of the variable delay elements $\tau$ is controlled by a delay instruction. Furthermore, the variable delay elements $\tau$ are implemented by, for example, a plurality of inverter circuits connected in series, as illustrated in FIG. 14. Each of the inverter circuits includes, for example, a pair of transistors provided between a DC power supply and the ground. In this case, each of the inverter circuits includes one nMOS transistor and one pMOS transistor. Then, a signal line between the inverter circuits is connected to the ground via a variable capacitor. In this case, a delay amount of each of the variable delay elements $\tau$ is adjusted by controlling the capacitance of the variable capacitor with an electric signal corresponding to the delay instruction.

A photo detector (PD) 22$a$ and a monitor signal generation circuit 22$b$ correspond to the power monitor 22 illustrated in FIG. 7. The photo detector 22$a$ includes a photodiode, and generates a current signal indicating power of light extracted by an optical filter 23. The monitor signal generation circuit 22$b$ converts the current signal output from the photo detector 22$a$ into a voltage signal. This voltage signal is used as a monitor signal. A controller 14$a$ corresponds to the delay controller 14 illustrated in FIG. 7. Based on the monitor signal, the controller 14$a$ controls the delay amount of each of the variable delay elements $\tau$ of the delay circuit 12.

Figure 15:
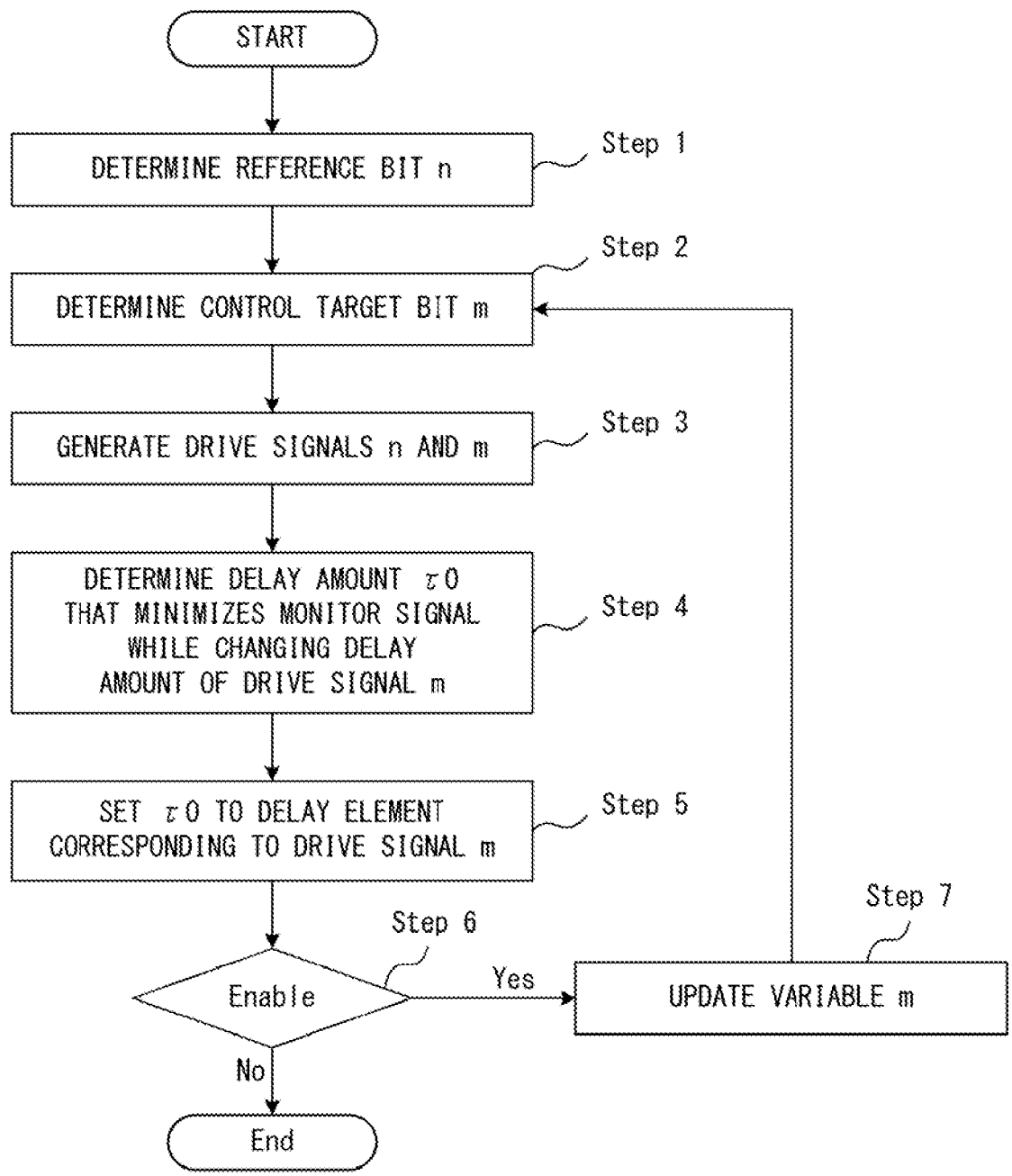
FIG. 15 is a flowchart illustrating an example of a process for adjusting a timing of a drive signal of the optical modulator.

FIG. 15 is a flowchart illustrating an example of a process of adjusting timings of the drive signals of the optical modulator 120. The process of this flowchart is executed at the time of activation of the optical transmitter 3, for example. Note that the optical transmitter 3 generates an optical signal in which each symbol transmits N bits. That is, the signal processing circuit 11 generates N drive signals 0 to N−1. N is 4 in the example illustrated in FIG. 13.

In Step 1, the controller 14$a$ determines a reference bit n. The reference bit n is any one bit in the N bits. In Step 2, the controller 14$a$ determines a control target bit m. The control target bit m is any one bit other than the reference bit in the N bits. In Step 3, according to an instruction given from the controller 14$a$, the signal processing circuit 11 outputs a drive signal n indicating the reference bit n and a drive signal m indicating the control target bit m. At this time, the signal processing circuit 11 does not output other drive signals. Thus, the optical modulator 120 outputs an optical signal indicating the reference bit n and the control target bit m.

In Step 4, while changing a delay amount of the drive signal m by using the delay instruction, the controller 14$a$ determines a delay amount T0 that minimizes the monitor signal. At this time, the delay amount of the drive signal n is fixed. Note that the delay amount of the drive signal m is swept in a range of ±T. "T" corresponds to a reciprocal of a symbol rate of a transmission signal. For example, when the symbol rate is 50 Gsymbols/second (or 50 Gbaud), T is 20 ps. In addition, the delay instruction is realized by a voltage signal applied to a variable delay element $\tau$ corresponding to the drive signal m.

In Step 5, the controller 14$a$ sets the delay amount $\tau 0$, which is determined in Step 4, for the variable delay element $\tau$ corresponding to the drive signal m. As a result, timing of the drive signal m is optimized with respect to the drive signal n.

In Step 6, the controller 14$a$ determines whether an Enable signal is valid. The Enable signal indicates execution of Step 2 to Step 5. For example, at the time of activation of the optical transmitter 3, the Enable signal is set to be valid. Also, when a temperature of the optical transmitter 3 changes, the Enable signal is set to be valid. Then, when the Enable signal is valid, the controller 14$a$ increments a variable m in Step 7. However, when the variable m reaches N, the variable m is initialized to 1. Subsequently, the processing of the controller 14$a$ returns to Step 2.

As described above, in a period in which the Enable signal is valid, the controller 14$a$ repeatedly executes Step 2 to Step 5 while incrementing the variable m. That is, the controller 14$a$ sequentially selects the drive signals one by one and executes Step 2 to Step 5. As a result, timing of each of the other drive signals is optimized with respect to the drive signal n. That is, a skew between the drive signals is minimized. Thus, timings of all the drive signals are optimized, and quality of a modulated optical signal generated by the optical modulator 120 is improved.

Note that the controller 14$a$ (or delay controller 14 illustrated in FIG. 7) is implemented by, for example, a processor system including a processor and a memory. In this case, a program code describing a procedure illustrated in FIG. 15 is stored in the memory, and a function of the controller 14$a$ is provided when the processor executes the program code. Alternatively, the controller 14$a$ may be implemented by a hardware circuit designed to implement the procedure illustrated in FIG. 15.

Figure 16:
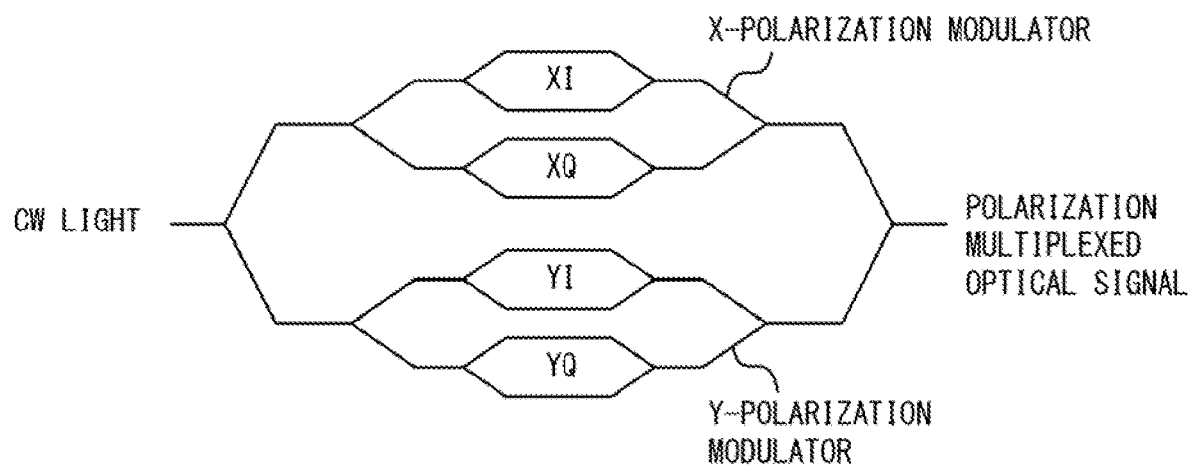
FIG. 16 illustrates an example of a polarization multiplexing IQ optical modulator.

FIG. 16 illustrates an example of a polarization multiplexing IQ optical modulator. The polarization multiplexing IQ optical modulator includes an X-polarization modulator and a Y-polarization modulator. The X-polarization modulator and the Y-polarization modulator are provided in parallel to each other. The X-polarization modulator includes an XI modulator and an XQ modulator. The XI modulator and the XQ modulator are provided in parallel to each other. Similarly, the Y-polarization modulator includes a YI modulator and a YQ modulator. The YI modulator and the YQ modulator are provided in parallel to each other.

In the polarization multiplexing IQ optical modulator having the above configuration, continuous wave light is input to each of the XI modulator, the XQ modulator, the YI modulator, and the YQ modulator. In addition, drive signals are provided to the XI modulator, the XQ modulator, the YI modulator, and the YQ modulator, respectively. Thus, the XI modulator, the XQ modulator, the YI modulator, and the YQ modulator respectively generate an XI optical signal, an XQ optical signal, a YI optical signal, and a YQ optical signal. Here, an X-polarized optical signal is generated by combining the XI optical signal and the XQ optical signal with an appropriate phase difference, and a Y-polarized optical signal is generated by combining the YI optical signal and the YQ optical signal with an appropriate phase difference. Then, the X-polarized optical signal and the Y-polarized optical signal are combined by a polarization beam combiner and a polarization multiplexed optical signal is generated.

Each of the XI modulator, the XQ modulator, the YI modulator, and the YQ modulator is implemented by, for example, the configuration illustrated in FIG. 13. In this case, the signal processing circuit 11 may be shared by the XI modulator, the XQ modulator, the YI modulator, and the YQ modulator. According to this configuration, since quality of the optical signals generated by the XI modulator, the XQ modulator, the YI modulator, and the YQ modulator is high, quality of the polarization multiplexed optical signal transmitted from the polarization multiplexing IQ optical modulator is also high.

Figure 17:
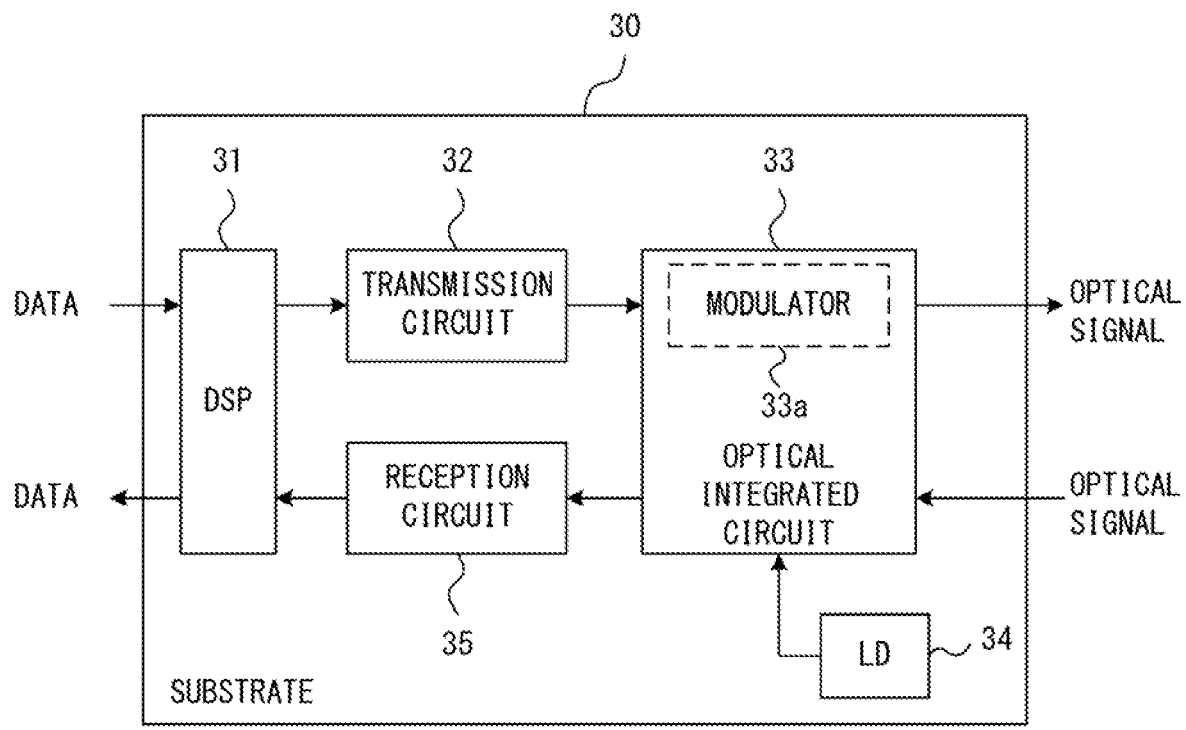
FIG. 17 illustrates an example of an optical transceiver in which the optical transmitter according to the embodiment of the present invention is implemented.

FIG. 17 illustrates an example of an optical transceiver in which the optical transmitter according to the embodiment of the present invention is mounted. An optical transceiver 30 includes a DSP chip 31, a transmission circuit chip 32, an optical integrated circuit chip 33, a light source (LD) 34, and a reception circuit chip 35. The DSP chip 31 generates a drive signal from transmission data according to a designated modulation scheme. The signal processing circuit 11 illustrated in FIG. 13 is implemented by the DSP chip 31. The transmission circuit chip 32 includes the delay circuit 12, the driver circuit 15, and the controller 14a illustrated in FIG. 13, and can adjust timing of the drive signal generated by the DSP chip 31. The optical integrated circuit chip 33 includes a modulator 33a, and modulates continuous wave light output from a light source 34 with the drive signal and generates a modulated optical signal. The modulator 33a corresponds to the optical modulator 120 illustrated in FIG. 13. In addition, the optical integrated circuit chip 33 includes a coherent receiver (not illustrated) and generates an electric field information signal indicating a received optical signal. The reception circuit chip 35 reproduces a bit string from the electric field information signal indicating the received optical signal. Subsequently, the DSP chip 31 performs decoding processing, error correction processing, and the like and reproduces received data.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An optical transmitter comprising:
   a signal processing circuit configured to generate N drive signals;
   an optical modulator configured to include a Mach-Zehnder interferometer and N phase-shift segments each of which shifts a phase of light propagating through an optical path of the Mach-Zehnder interferometer according to the N drive signals, and generate a modulated optical signal according to the N drive signals, a symbol rate of the modulated optical signal being fs and each symbol of the modulated optical signal transmitting N bits, N being an integer equal to or larger than 2;
   an optical filter configured to remove, from output light of the optical modulator, a frequency component in a range of #fs/2 with respect to a center frequency of the modulated optical signal to generate a filtered modulated optical signal, and extract at least a part of frequency components of the filtered modulated optical signal; and
   a delay circuit configured to control timings of the N drive signals in such a manner as to reduce optical power of the frequency component extracted by the optical filter.

2. The optical transmitter according to claim 1, wherein the N drive signals are filtered by a filtering process, a cutoff frequency of the filtering process being fs/2, in the signal processing circuit.

3. The optical transmitter according to claim 1, wherein the optical filter extracts a frequency component in a range between a first frequency separated for fs/2 from the center frequency of the modulated optical signal and a second frequency separated for 3 fs/2 from the center frequency.

4. The optical transmitter according to claim 1, wherein
   the optical filter has a periodic transmission characteristic alternately including passbands and block bands,
   a width of each of the passbands is fs and a width of each of the block bands is fs,
   one of the block bands is configured for a frequency range of ±fs/2 with respect to the center frequency of the modulated optical signal, and
   the delay circuit controls timings of the N drive signals so as to reduce optical power of a frequency component passing through the pass bands.

5. The optical transmitter according to claim 1, wherein the delay circuit includes
   N delay elements respectively provided for the N drive signals, and
   a processor that controls delay amounts of the N delay elements based on the optical power of the frequency component extracted by the optical filter.

6. The optical transmitter according to claim 5, wherein the processor:
   selects a first drive signal among the N drive signals;
   selects a second drive signal among the N drive signals;

fixes a delay amount of a first delay element in the N delay elements provided for the first drive signal; and determines a delay amount of a second delay element in the N delay elements provided for second drive signal so as to minimize the optical power of the frequency component extracted by the optical filter in a state in which only the first drive signal and the second drive signal are provided to the optical modulator.

* * * * *